United States Patent Office 3,565,604
Patented Feb. 23, 1971

3,565,604
PRODUCTION OF SPHERICAL-PARTICLE
POWDERS OF METALS
Yumi Akimoto, Omiya-shi, Takeyoshi Shibasaki, Urawa-shi, and Seiichi Ihara, Omiya-shi, Japan, assignors to Mitsubishi Kinzoku Kogyo Kabushiki Kaisha, Tokyo, Japan, a joint-stock company of Japan
No Drawing. Filed Dec. 31, 1968, Ser. No. 788,320
Claims priority, application Japan, Jan. 10, 1968, 43/830
Int. Cl. B22f 9/00
U.S. Cl. 75—.5
7 Claims

ABSTRACT OF THE DISCLOSURE

A reaction substance such as ammonia or methanol which gives off hydrogen when decomposed by heating is brought into contact with a pure or alloy metal maintained in a molten state at a temperature above the decomposition temperature of the reaction substance, whereupon an atmosphere of atomic hydrogen is created on the molten metal surface and reacts with the metal to form transitionally a volatile hydride of the metal, which can be easily decomposed into its elemental constituents including the metal now in the form of fine spherical particles.

BACKGROUND OF THE INVENTION

This invention relates to methods for producing spherical particle powders of metals and more particularly to a new method for producing such powders by an extremely simple, a gaseous-phase process.

Powders of metals and metal alloys are at present being widely used for various purposes beginning with powder metallurgy and including their uses as catalysts and melt spraying materials. Numerous methods are practiced in the production of these powders, the most common methods being mechanical pulverisation and electrolytic precipitation.

These powders must be made to satisfy various requirements of powder metallurgical technology relating to features of form and structure depending on various conditions, examples of such features being particle size, compressability or densification property, sintering property, and fluidity. Particularly spherical-particle powders (hereinafter referred to as "spherical powders") are most suitable for melt spraying because of their high fluidity. For the same reason, the pressure distribution within such a powder being pressed into an article becomes uniform, whereby the finished product also can be made to have a homogeneous structure.

The greatest use of these spherical powders is that in porous sintered structures and materials. More specifically, examples of the use of spherical powders in such structures and materials are metal filter elements made by using spherical powder of uniform particle size, oil-occluding bearings in which the pores within sintered structures are utilised, catalysers and electrodes in which the large specific surface areas of such porous materials are utilised, lamp and oil burner wicks in which the capillary action of the pores is utilised, and packings in which the high compressibility of these materials is utilised. Thus, spherical powders are highly useful.

Examples of methods used at present for producing spherical powders are as follows.

(1) Carbonyl method which is used principally for producing spherical powders of nickel and iron and comprises forming first a gaseous metal carbonyl under high pressure and heating and decomposing the same in a decomposition vessel to produce metal powder. While fine powder of high purity can be thus obtained, the cost is high, whereby the use of this method is limited. Furthermore, the metals to which this method can be applied are at present limited to iron and nickel.

(2) Seuerwald method which comprises heating metal or metal alloy powder together with a powder of a refractory material thereby to melt the metal and forming spherical powder by utilizing the surface tension of the molten metal. This method, however, has not been reduced to a practical state.

(3) Intergranular corrosion method which can be applied to materials such as stainless steel in which precipitates are formed in the particle field, and there is a possibility of obtaining powder of crystalline particle units by causing corrosion of these precipitates. This method, therefore, is not generally applicable.

(4) Evaporation-condensation method which is practically applicable with respect to high-vapour-pressure metals, zinc, cadmium, magnesium, etc., but production of alloys is difficult because of occurrence of fractional distillation.

(5) Spraying method which has heretofore been considered to be the most effective method for producing spherical powders. This method comprises blasting and scattering molten metal with a gas such as air, carbon dioxide, or an inert gas under pressure and is applicable, theoretically, to any metal or metal alloy as long as it is meltable. However, since the process necessitates handling molten metal at high temperatures, it is accompanied by several technical difficulties in actual practice such as those in maintaining the equipment at high temperatures, and heat resistance and wear resistance of nozzles.

It is well known that, in general, the thermal decomposition of certain substances such as ammonia and methanol is promoted catalytically by contact with a metal at a high temperature, and during this decomposition reaction process, nascent-state hydrogen (in the atomic state) is produced. This nascent-state hydrogen immediately under-goes recombination to become ordinary molecular hydrogen.

We have discovered with respect to this process that, by supplying the decomposition reaction substance at a sufficiently high rate as the temperature of the metal to promote the thermal decomposition of this substance is maintained amply higher than that of the thermal equilibrium condition of that substance, and, moreover, as care is exercised to prevent thermal decomposition of this substance prior to its contact with the surface of the metal, it is possible to create an amosphere of atomic hydrogen along the metal surface and to generate from this atmosphere a vapour of a hydride of the metal of a character which cannot exist in an equilibrium reaction of ordinary molecular hydrogen or the substance and the metal.

The above mentioned substance which gives off hydrogen upon decomposing is supplied, in general, in a gaseous form, but it may be supplied in the form of a spray, a liquid, or a powder in some cases.

While the metal hydride vapour generated in the process is promptly carried away from the metal surface by the reaction gas flow, the half life (half decay period) of the atomic hydrogen is extremely short as mentioned hereinabove, whereby the partial pressure of the atomic hydrogen within the reaction gases decreases rapidly with distance away from the metal surface. In accordance with this decrease, the metal hydride vapour which has once been formed also decomposes immediately into its component elements.

In the case wherein the temperature of the process atmosphere at this time is higher than the melting point of the metal, and, moreover, the vapour pressure of the metal is low, the metal formed by decomposition is carried in the form of droplets by the gas flow, and when these droplets are cooled, they solidify as spherical particles. We have found further that this rendering into spherical particles by the above described process is possible with a large variety of metals.

SUMMARY OF THE INVENTION

It is an object of the present invention to overcome the aforedescribed difficulties accompanying known methods of producing sperical powders.

More specifically, an object of the invention is to provide, by utilizing the above described discoveries and other findings as described hereinafter, a simple and economical method for producing spherical powders of metals (including alloy metals and even metals of relatively high melting points), which method comprises, essentially, a gaseous-phase reaction and can be carried out with extremely simple and low-cost apparatus and procedure.

According to the present invention, briefly summarised, there is provided a method for producing spherical powders of metals characterised by the steps of causing a reaction substance which gives off hydrogen when thermally decomposing to contact a molten metal maintained at a temperature above the decomposition temperature of the reaction substance thereby to form spherical metal powder particles and collecting these particles by utilising resulting reaction gases.

The nature, details, and utility of the invention will be more clearly apparent from the following detailed description beginning with general considerations and concluding with specific examples of preferred embodiment of the invention.

DETAILED DESCRIPTION

While ammonia and methanol are, industrially, the most important substances for reaction with a metal in accordance with the invention, the range of substances which can be used is wide, examples being formaldehydes, urea, methanol amines, ethylene glycol, and glycerine. These substances can also be used in a diluted state through the use of a diluent gas such as argon, hydrogen, and nitrogen which will not impair the reaction system. However, substances which produce a large quantity of carbon or harmful gases during the decomposition are not desirable for reasons of after treatment and work-place atmosphere.

More specifically, a reaction substance suitable for use in accordance with the invention is composed of hydrogen and at least one element from among carbon, nitrogen, and oxygen, is a compound in which, in the case where it contains carbon or oxygen, the number of carbon atoms is equal to or less than the number of oxygen atoms within the molecule, and, moreover, the number of hydrogen atoms is two or more times the number of oxygen atoms, and assumes a gaseous state at a high temperature.

The balling or sphering of metals according to the invention is possible, in principle, with respect all metals which can form hydrides and all alloys thereof. We have found that this method can be practiced in accordance with the following specific features of procedure.

(1) A metal or a metal alloy is heated to a temperature above its melting point in an inert atmosphere and rendered into the molten state. It is necessary that this temperature be above the value at which the reaction substance amply decomposes upon contacting the metal or alloy. For example, this temperature is from 1,200 to 1,300 degrees C. in the case of copper and 800 degrees C. in the case of indium.

(2) The reaction substance is caused to contact the surface of the molten metal or blown into the molten metal by means of a pipe when the substance is a gase and an autofeeder when it is as solid as the substance is prevented from undergoing thermal decomposition prior to its contacting the metal surface.

(3) The resulting spherical powder is conveyed to a collecting vessel by a carrier gas or the gases formed by the decomposition.

We have found that the particles produced by this sphering process are of particle size which range widely from approximately one micron to several tens of microns in diameter and that the external shape of these particles is almost perfectly spherical. We have found further that, in the case of a metal alloy powder, the composition of the particles thus obtained is equivalent to that of the original alloy.

The method according to the invention has the following advantageous features.

(1) Spherical powders of metals of relatively high melting points can be easily produced.

(2) Spherical powders not only of single metals but also of alloys each containing two or more metals as constituents can be produced.

(3) In the spraying method, technical difficulties naturally tend to develop because of the mechanical handling of molten metals at high temperatures. In contrast, the method of the invention requires only a simple operation which comprises merely gasification of the reaction substance and blowing the same. Accordingly, the method is highly economical because of low equipment cost and other costs. Furthermore, the gases formed by the reaction can be recovered and recombined or can be utilised for other uses such as, for example, as an atmospheric gas for heat treatment, fuel, and other uses in the chemical industry.

(4) While the method of the invention involves essentially a gaseous-phase reaction, the process thereof is not complicated as compared with those of other gaseous-phase reactions as, for example, the aforementioned carbonyl method, evaporation method, and the thermal decomposition method. Accordingly, special vessels are not necessary, and the selectivity of the reaction is relatively unrestricted, spherical powders of various metals and metal alloys being readily and economically producible.

In order to indicate still more fully the nature and utility of the invention, the following specific examples of preferred embodiment of the invention are set forth, it being understood that these examples are presented as illustrative only and that they are not intended to limit the scope of the invention.

EXAMPLE 1

Methanol was vapourised and blown at a rate of 1 litre per minute with argon gas as a carrier gas onto crude copper heated to and maintained at 1,350±25 degrees C., the methanol thereby being caused to decompose and react with the molten metal. The resulting powder particles were collected in a collecting vessel and a filter water cooled to 25 degrees C. and installed in the discharged gas flow path.

The powder thus produced was found to be composed of fine spherical particles most of which had a diameter of the order of 20 microns.

EXAMPLE 2

Molten copper containing 10 percent of silver was heated and maintained at 1,250±25 degrees C. Against this molten copper, gaseous ammonia supplied from a liquid ammonia tank and passing through a vapouriser was blow at a rate of 1 litre per minute while care was exercised to prevent the ammonia from undergoing thermal decomposition at an intermediate point.

The resulting discharge gas was filtered by means of a collector and a filter water cooled to 25 degrees C., whereupon a spherical powder having an average particle size of approximately 40 microns in diameter and having almost the same composition as the original alloy was obtained.

EXAMPLE 3

Molten copper containing 10 percent of silver was heated and maintained at 1,100±25 degrees C. Into this melt, fine particles (−200 mesh) of urea were introduced at a rate of 6 grammes (g.) per minute by means of nitrogen as a carrier gas, thereby causing the urea to react with the melt, whereupon a powder was formed and collected by a cooled collector and a filter disposed in the discharge gas flow path. This powder was found to consist of spherical particles which were in the state of a solid solution of the composition of the original alloy and had a average diameter of 40 microns.

EXAMPLE 4

Indium of 99.9 percent purity was heated and maintained at 800±25 degrees C. Against this indium, a formaldehyde gas supplied from a vapouriser and diluted with an equal volume of argon gas was blown, whereupon a spherical powder indium was produced and collected in a cooled collector.

EXAMPLE 5

A molten copper alloy containing 35 percent of nickel, 2 percent of iron, and 2 percent of manganese was heated and maintained at 1,450±25 degrees C. Against this molten alloy, a mixture of ammonia rendered into a gaseous state by a vapouriser and hydrogen in a ratio by volume of approximately 10 to 1 was blown at a rate of 1.5 litres per minute as care was exercised to prevent thermal decomposition of the ammonia at an intermediate point. The resulting copper alloy powder particles were collected by means of a collector and a filter installed in the discharge gas flow path.

As a result, spherical particles (average diameter of 10 microns) of an alloy of almost the same composition as the original alloy were obtained.

We claim:
1. A method for producing spherical-particle powders of metals which comprises contacting a substance which gives off hydrogen upon undergoing thermal decomposition with a molten metal maintained at a temperature above the decomposition temperature of said substance whereby spherical metal powder particles are formed accompanied by gases generated as a result of the decomposition, and collecting said powder particles by utilizing said gases.

2. A method for producing spherical-particle powders of metals which comprises: melting and maintaining a metal at a process temperature above the melting point thereof and above the decomposition temperature of a substance which gives off hydrogen upon undergoing thermal decomposition; contacting said substance with said metal thus maintained at said process temperature thereby causing transitional formation of a volatile hydride of the metal, accompanied by gases generated from the decomposition; conveying said hydride away from the place of said reaction by means of said gases; and cooling said hydride.

3. The method for producing spherical-particle powders of metals as claimed in either of claims 1 and 2, in which said substance is a compound selected from the group consisting of ammonia, methanol, formaldehydes, urea, methanol amines, ethylene glycol, and glycerine.

4. The method for producing spherical-particle powders of metals as claimed in either of claims 1 and 2, in which said substance is used in a state of dilution by a gas selected from the group consisting of argon, hydrogen, nitrogen, and other gases which will not impair the reaction system.

5. The method for producing spherical-particle powders of metals as claimed in either of claims 1 and 2, in which said substance is caused to contact said metal at a high supply rate, which is of the order of from 1 to 1.5 liters per minute in the case where the substance is supplied in a gaseous state.

6. The method for producing spherical-particle powders of metals as claimed in either of claims 1 and 2, in which said metal is an alloy metal.

7. The method for producing spherical-particle powders of metals as claimed in either of claims 1 and 2, in which said substance is supplied continuously to contact said metal, thereby to produce said metal powder particles by a continuous process.

References Cited

UNITED STATES PATENTS

| | | | |
|---|---|---|---|
| 2,753,255 | 7/1956 | Alexander et al. | 75—.5 |
| 3,049,421 | 8/1962 | Allen et al. | 75—.5 |

L. DEWAYNE RUTLEDGE, Primary Examiner

W. W. STALLARD, Assistant Examiner

U.S. Cl. X.R.

264—5, 12